United States Patent
Qin et al.

(10) Patent No.: US 12,113,297 B2
(45) Date of Patent: Oct. 8, 2024

(54) ANTENNA AND BASE STATION

(71) Applicant: HUAWEI TECHNOLOGIES CO., LTD., Guangdong (CN)

(72) Inventors: Mingfu Qin, Shenzhen (CN); Libiao Wang, Dongguan (CN); Siyan Chen, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 321 days.

(21) Appl. No.: 17/541,389

(22) Filed: Dec. 3, 2021

(65) Prior Publication Data

US 2022/0094057 A1 Mar. 24, 2022

Related U.S. Application Data

(63) Continuation of application No. PCT/CN2019/089874, filed on Jun. 3, 2019.

(51) Int. Cl.
*H01Q 3/38* (2006.01)
*H04W 16/28* (2009.01)
*H04W 88/10* (2009.01)

(52) U.S. Cl.
CPC .............. *H01Q 3/38* (2013.01); *H04W 16/28* (2013.01); *H04W 88/10* (2013.01)

(58) Field of Classification Search
CPC .......... H01Q 3/38; H01Q 3/40; H01Q 25/002; H01Q 21/24; H04W 16/28; H04W 88/10; H04B 7/0617
See application file for complete search history.

(56) References Cited

U.S. PATENT DOCUMENTS

2016/0322708 A1* 11/2016 Tayfeh Aligodarz ........................ H01Q 21/0087
2017/0062950 A1*  3/2017 Wang ................... H01Q 25/001
(Continued)

FOREIGN PATENT DOCUMENTS

| CN | 200950586 Y | 9/2007 |
| CN | 101359947 A | 2/2009 |

(Continued)

OTHER PUBLICATIONS

Office Action issued in Chinese Application No. 201980097050.7 on Aug. 22, 2022, 13 pages (with English translation).
(Continued)

*Primary Examiner* — Seokjin Kim
(74) *Attorney, Agent, or Firm* — Fish & Richardson P.C.

(57) ABSTRACT

The present disclosure provides an example antenna and an example base station. One example antenna includes a first sub-array and a second sub-array disposed adjacent to each other, where the first sub-array includes N first sub-antennas arranged in an array, and the second sub-array includes N second sub-antennas arranged in an array and connected to multiple phase shifters. Each row of the N first sub-antennas includes M first sub-antennas, each row of the N second sub-antennas includes M sub-antennas, each row of the N first antennas and each row of the N second sub-antennas are arranged in a row, and an $m^{th}$ first sub-antenna and an $m^{th}$ second sub-antenna are connected to a radio frequency unit by using a power splitter, where N is a natural number, M is a natural number less than N, and m is a natural number less than or equal to M.

16 Claims, 7 Drawing Sheets

(56) References Cited

U.S. PATENT DOCUMENTS

2018/0302175 A1* 10/2018 Yuan ............... H04B 15/00
2020/0044345 A1*  2/2020 Zimmerman ......... H04W 16/28

FOREIGN PATENT DOCUMENTS

| CN | 102812645 B   |  8/2015 |
|----|---------------|---------|
| CN | 105264938 A   |  1/2016 |
| CN | 106033989 A   | 10/2016 |
| CN | 107196684 A   |  9/2017 |
| CN | 108134216 A   |  6/2018 |
| EP |   3229382 A1  | 10/2017 |
| EP |   3591857 A1  |  1/2020 |
| EP |   3627621 A1  |  3/2020 |
| WO | 2015082000 A1 |  6/2015 |
| WO | 2018177142 A1 | 10/2018 |
| WO | 2018223979 A1 | 12/2018 |

OTHER PUBLICATIONS

Extended European Search Report issued in European Application No. 19931968.2 on May 11, 2022, 11 pages.

PCT International Search Report and Written Opinion issued in International Application No. 17 on Mar. 4, 2020, 17 pages (with English translation).

* cited by examiner

ANTENNA AND BASE STATION

CROSS-REFERENCE TO RELATED APPLICATIONS

This application is a continuation of International Application No. PCT/CN2019/089874, filed on Jun. 3, 2019, the disclosure of which is hereby incorporated by reference in its entirety.

TECHNICAL FIELD

This application relates to the field of communication technologies, and in particular, to an antenna and a base station.

BACKGROUND

Currently, mainstream multi-beam antennas support 2*2T2R or 2*4T4R. Manufactured antennas in the conventional technology are basically fixed, and consequently, adaptive evolution cannot be performed. For example, one antenna supports only a 1*4T4R mode, supports only a 2*4T4R mode, or supports only a 4*4T4R mode. When an area corresponding to the antenna needs to be adjusted, the antenna cannot be switched from the 1*4T4R mode to the 2*4T4R mode or the 4*4T4R mode. Therefore, an antenna needs to be reconfigured, causing a waste of resources.

SUMMARY

This application provides an antenna and a base station, to improve applicability of the antenna.

According to a first aspect, an embodiment of this application provides an antenna, where the antenna is configured to send a signal. During specific disposing, the antenna includes digital beamforming and analog beamforming. A structure used for the analog beamforming includes a first sub-array and a second sub-array disposed adjacent to each other, where the first sub-array includes N first sub-antennas arranged in an array, and the second sub-array includes N second sub-antennas arranged in an array and connected to phase shifters. Each row of first sub-antennas includes M first sub-antennas, each row of second sub-antennas includes M sub-antennas, each row of first antennas and each row of second sub-antennas are arranged in a row, and an $m^{th}$ first sub-antenna and an $m^{th}$ second sub-antenna are connected to a radio frequency unit by using a power splitter, where N is a natural number, M is a natural number less than N, and m is a natural number less than or equal to M. During specific implementation, two sub-antennas can transmit different signals by connecting one of the two sub-antennas to a phase shifter. It can be learned from the foregoing description that, during antenna beamforming, beam splitting in antenna transmission is changed in collaboration with the analog beamforming, to improve applicability of an antenna without changing a hardware structure.

When the analog beamforming of the antenna is specifically set, in power splitters connected to the first sub-antennas in each row of first sub-antennas, a power-split ratio of a power splitter connected to an $n^{th}$ first sub-antenna is opposite to a power-split ratio of a power splitter connected to an $[M-(n-1)]^{th}$ first sub-antenna, and n is a natural number less than or equal to M. In this way, the antenna beamforming can be performed based on a specified area.

When the digital beamforming is specifically set, the antenna further includes a digital phase shifter. The digital phase shifter is connected to each radio frequency unit and is configured to transmit a plurality of signals to corresponding radio frequency units, and the digital phase shifter is further configured to superpose at least some of the plurality of signals to form a new signal. The signals are superposed to form a new signal by using the digital phase shifter.

During specific setting, beams of the antenna may be changed in different manners. For example, in a specific implementation, a quantity of the plurality of signals transmitted by the digital phase shifter is 4. In this case, four beams are transmitted by the antenna, which is a 4T4R mode. When beam splitting of the antenna needs to be changed, a plurality of input signals may be combined by using the digital phase shifter, to form different beam splitting. For example, in a specific implementation, two signals in the plurality of signals are superposed by using the digital phase shifter to form a first signal, and the other two signals are superposed by using the digital phase shifter to form a second signal. In this case, two beams are transmitted by the antenna, which is a 2T2R mode, and coverage of the two formed beams are the same. In addition, one beam may be further formed. During specific implementation, the digital phase shifter is further configured to superpose the four signals to form a fourth signal. The fourth signal is sent to a radio frequency unit to form one beam.

When the digital beamforming is specifically set, beams of the antenna may be changed in different manners. For example, in a specific implementation, three signals in the plurality of signals are superposed by using the digital phase shifter to form a third signal, and the other signal is directly sent to a radio frequency unit. In this case, a 2T2R mode is used, and a wide beam and a narrow beam are formed. During specific formation, any two beams may be superposed to form the third signal, and the other signal is used as a separate signal, to form the wide beam and the narrow beam that are different.

When the digital phase shifter sends the signals to the radio frequency units, each signal corresponds to a different phase when being transmitted to each radio frequency unit.

When the phase shifter is specifically set, a phase shifter connected to each second sub-antenna is a 180° phase shifter. However, it should be understood that the phase shifter provided in the embodiments of this application is not limited to the 180° phase shifter. Alternatively, phase shifters may be disposed at the two sub-antennas, and the two phase shifters are separately shifted by ±90°.

When the analog beamforming is specifically set, in any two radio frequency units, an output end of one radio frequency unit is connected to an output end of the other radio frequency unit by using a phase shifter.

According to a second aspect, a base station is provided, where the base station includes the antenna in the foregoing embodiment. During antenna beamforming, beam splitting in antenna transmission is changed by combining digital beamforming and analog beamforming, to improve applicability of an antenna without changing a hardware structure.

In a specific implementation, a quantity of antennas is 2, and the two antennas cover a same area, to improve a communication effect.

DESCRIPTION OF EMBODIMENTS

To make objectives, technical solutions, and advantages of this application more clearly, the following further describes this application in detail with reference to the accompanying drawings.

To facilitate understanding of the antenna provided in the embodiments of this application, an application scenario of the antenna is first described. The antenna is used in a base station, and is configured to send or receive a signal. When the antenna is used, a direction of a beam transmitted by the antenna determines coverage of the antenna. In a conventional technology, coverage of a beam of an antenna is fixed. Consequently, when an area that needs to be covered changes when the antenna is used, the antenna that has been set cannot apply. Therefore, the embodiments of this application provide a new antenna. The following describes the antenna provided in the embodiments of this application with reference to the accompanying drawings.

For ease of understanding, antenna beamforming is first described. Beamforming (Beamforming) is also referred to as beamforming and spatial filtering, and is a signal processing technology for directionally sending and receiving signals by using a sensor array. In the beamforming technology, a parameter of a basic unit of a phase array is adjusted, so that signals at some angles obtain constructive interference while signals at another angle obtain destructive interference. The beamforming can be applied to both a signal transmit end and a signal receive end. At the transmit end, a beamformer controls a phase and a signal amplitude of each transmit apparatus, to obtain a required constructive interference mode and a required destructive interference mode in a transmitted signal wave array. At the receive end, signals received by different receivers are combined in a proper manner, to obtain an expected signal radiation mode.

Figure 1:
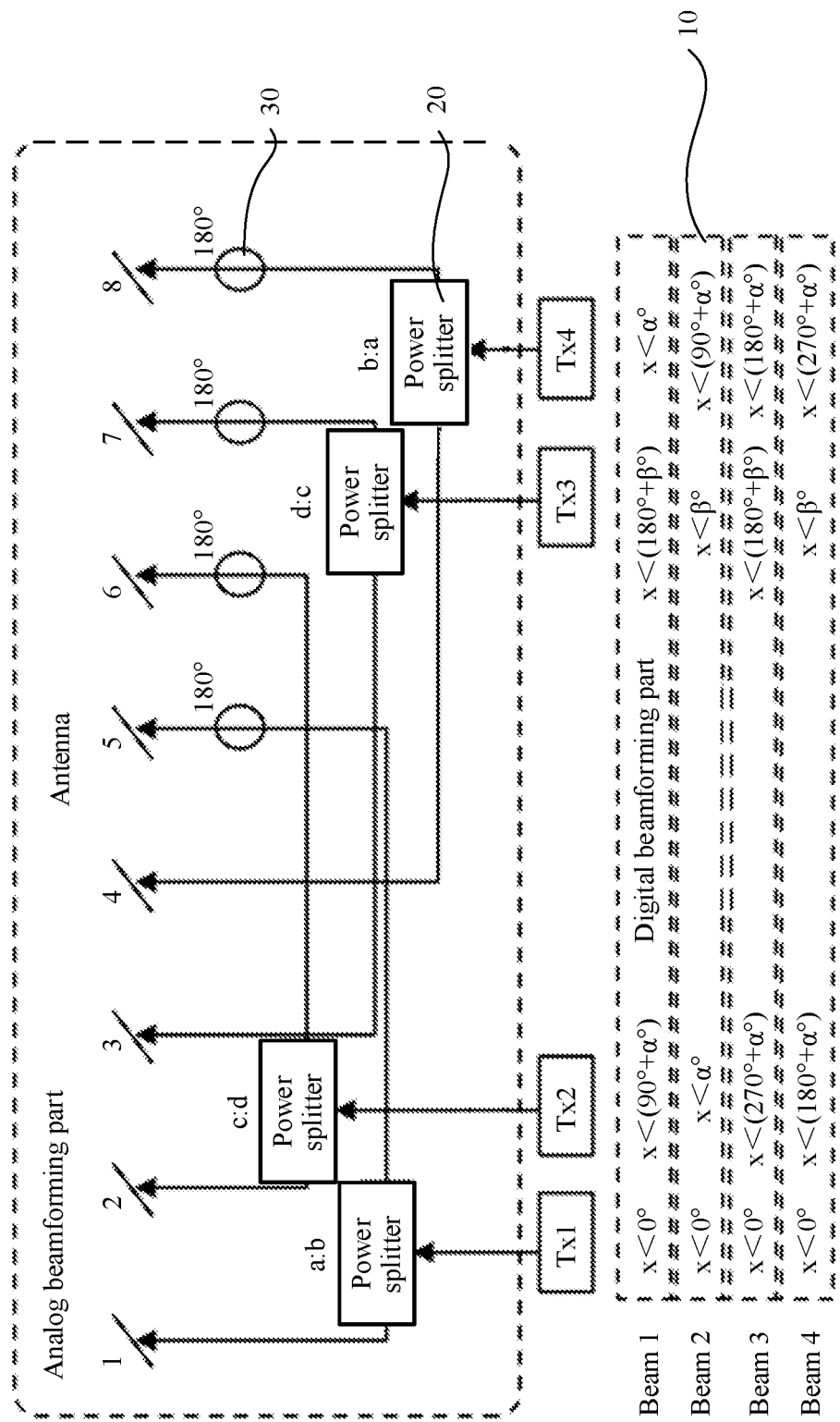
FIG. 1 is a block diagram of a structure of an antenna according to an embodiment of this application.
Figure 3:
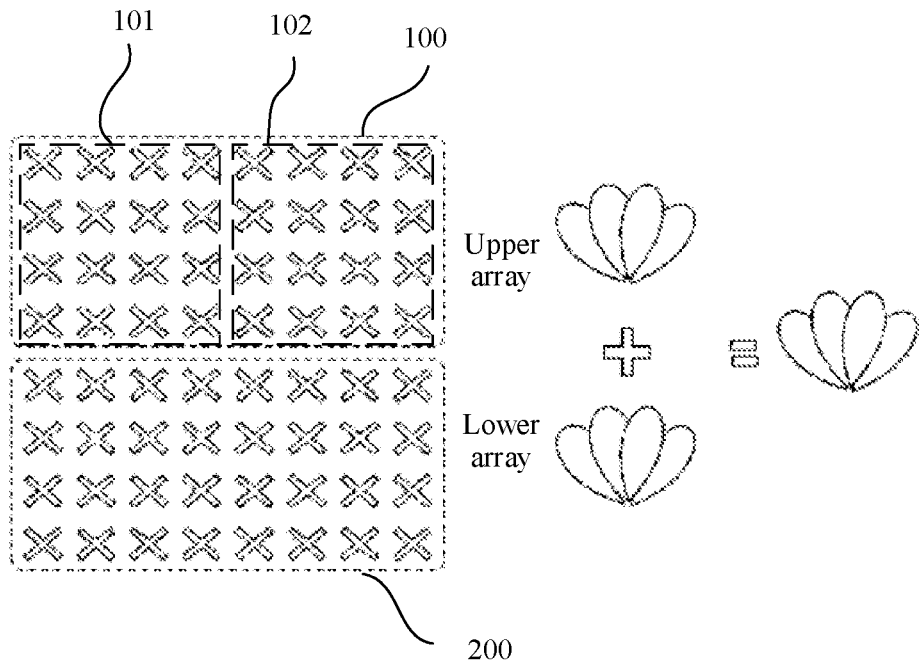
FIG. 3 shows another beamforming of an antenna according to this application.

According to the antenna provided in the embodiments of this application, adaptability of the antenna is improved by adjusting a range of beamforming of the antenna. During specific implementation, according to the antenna provided in the embodiments of this application, beamforming of the antenna is implemented through analog beamforming and digital beamforming (digital-analog hybrid beamforming). Refer to FIG. 1 and FIG. 3. FIG. 3 shows arrangement of sub-antennas in antennas. FIG. 3 shows an array including an antenna 100 and an antenna 200. A structure of the antenna 100 and a structure of the antenna 200 are the same. The antenna 100 is used as an example for description. The antenna 100 includes a first sub-array 101 and a second sub-array 102, and the first sub-array 101 and the second sub-array 102 are disposed adjacent to each other. The first sub-array 101 includes N first sub-antennas arranged in an array, and the second sub-array 102 includes N second sub-antennas arranged in an array. N is a natural number, for example, different natural numbers such as 8, 9, and 10. In FIG. 3, N is 16, that is, the first sub-array 101 includes 16 first sub-antennas, and the second sub-array includes 16 second sub-antennas. In addition, when the first sub-array and the second sub-array are disposed, each row of first sub-antennas includes M first sub-antennas, each row of second sub-antennas includes M sub-antennas, and each row of first antennas and each row of second sub-antennas are arranged in a row. That is, when the first sub-array 101 and the second sub-array 102 are disposed, each row of first sub-antennas and each row of second sub-antennas are disposed in a same row. A quantity of first sub-antennas in each row of first sub-antennas and a quantity of second sub-antennas in each row of second sub-antennas are both M (where M is a natural number, and M is less than N). In the structure shown in FIG. 3, a quantity of first sub-antennas in each row of first sub-antennas and a quantity of second sub-antennas in each row of second sub-antennas are both 4.

Refer to FIG. 1. FIG. 1 shows a structure of a row of first sub-antennas and a row of second sub-antennas. The first sub-antennas include a first sub-antenna 1, a first sub-antenna 2, a first sub-antenna 3, and a first sub-antenna 4. The second sub-antennas include a second sub-antenna 5, a second sub-antenna 6, a second sub-antenna 7, and a second sub-antenna 8. In addition, the antenna further includes a radio frequency unit and a power splitter. An $m^{th}$ first sub-antenna and an $m^{th}$ second sub-antenna are connected to a radio frequency unit by using a power splitter, where m is a natural number less than or equal to M. In the structure shown in FIG. 1, the first sub-antenna 1 and the second sub-antenna 5 are connected to a radio frequency unit Tx1 by using a power splitter, the first sub-antenna 2 and the second sub-antenna 6 are connected to a radio frequency unit Tx2 by using a power splitter, the first sub-antenna 3 and the second sub-antenna 7 are connected to a radio frequency unit Tx3 by using a power splitter, and the first sub-antenna 4 and the second sub-antenna 8 are connected to a radio frequency unit Tx4 by using a power splitter. In addition, when the second sub-antennas are specifically set, each second sub-antenna is connected to one phase shifter 30. That is, phases of signals transmitted by two sub-antennas (the first sub-antenna and the second sub-antenna) that are connected to each radio frequency unit are different. Certainly, different from the manner shown in FIG. 1, alternatively, a phase shifter may be disposed for each of two sub-antennas (the first sub-antenna and the second sub-antenna), and the two phase shifters are separately shifted by ±90°.

Still refer to FIG. 1. An output end of the radio frequency unit Tx1 is connected to a power splitter 20, where the power splitter 20 is a one-two power splitter, and the one-two power splitter divides a signal into two signals and separately transmits the two signals to the first sub-antenna and the second sub-antenna. During power allocation of the power splitter 20, allocation may be performed based on a specified ratio. For example, a ratio of power allocated by the power splitter 20 shown in FIG. 1 to the first sub-antenna to power allocated by the power splitter 20 to the second sub-antenna is a:b, where a and b are positive numbers, for example, 1, 2, 3, and 4. During specific setting, a and b can be set based on an actual requirement. For example, a=1 and b=1. In this case, the power splitter 20 is a one-two equal power splitter.

To implement beamforming of the antenna, waves transmitted by the first sub-antenna and the second sub-antenna need to be enhanced after being superposed at a specified angle. Therefore, when the first sub-antenna and the second sub-antenna transmit signals, a manner in which phases of signals transmitted by the first sub-antenna and the second sub-antenna are different is used to enhance transmitted waves at a specific angle. During specific implementation, the phase shifter 30 is disposed. The phase shifter 30 may be of a microstrip structure, a conducting wire structure, or another structure that can implement phase shifting. Therefore, phases of signals transmitted by the first sub-antenna and the second sub-antenna are different. When the first sub-antenna and the second sub-antenna transmit the signals, phases of waves transmitted by the first sub-antenna and the second sub-antenna are the same at a required position, to implement beamforming. It should be understood that disposing the phase shifter 30 at one of the sub-antennas is merely a specific implementation. In the embodiments of this application, beamforming can be implemented provided that same phases at a required position are implemented by the first sub-antenna and the second sub-antenna. Therefore, during disposing, the first sub-antenna and the second sub-antenna may be separately connected to a power splitter 20 by using a phase shifter 30, and a phase shifting angle of a phase shifter 30 connected to each sub-antenna may be adjusted to meet the foregoing requirement. For example, when a phase shifter 30, shown in FIG. 1, connected to one of two sub-antennas is a 180° phase shifter 30, a phase difference between signals transmitted by the two sub-antennas is 180°. Alternatively, to implement a phase difference 180° between signals, two sub-antennas each may be connected to one phase shifter and phase shifts of the two phase shifters 30 are ±90° respectively. In this case, a phase difference between signals transmitted by the two sub-antennas is also 180°. Therefore, a correspondence between phase shifters 30 and sub-antennas provided in this embodiment of this application may be determined based on a requirement. A manner in which only a second sub-antenna is correspondingly connected to a phase shifter 30 may be used, or a manner in which two sub-antennas each are separately connected to a phase shifter 30 may be used. Certainly, a phase shifting range of the disposed phase shifter 30 may be determined according to a specific case.

Connection relationships between other radio frequency units Tx2, Tx3, and Tx4 and corresponding sub-antennas are similar to the foregoing described connection relationship between the radio frequency unit Tx1 and the sub-antennas. Still refer to FIG. 1. The radio frequency unit Tx2, Tx3, and Tx4 each are correspondingly connected to a first sub-antenna and a second sub-antenna by using a connected power splitter 20. In addition, when power allocation of a power splitter 20 correspondingly connected to each radio frequency unit is set, in power splitters connected to the first sub-antennas in each row of first sub-antennas, a power-split ratio of a power splitter connected to an $n^{th}$ first sub-antenna is opposite to a power-split radio of a power splitter connected to an $[M-(n-1)]^{th}$ first sub-antenna, where n is a natural number less than or equal to M. For example, M is 4, and n may be a natural number such as 1, 2, 3, or 4. As shown in FIG. 1, four power splitters are arranged along an arrangement direction of the sub-antennas, and a ratio of power allocated by a power splitter at a head to a corresponding first sub-antenna and second sub-antenna is opposite to a ratio of power allocated by a power splitter at a tail to a corresponding first sub-antenna and second sub-antenna. As shown in FIG. 1, a power splitter 20 corresponding to the radio frequency unit Tx1 and a power splitter 20 corresponding to the radio frequency unit Tx4 are located at a head and a tail respectively, and power allocation ratios of the two power splitters are set as follows: A power allocation ratio of the power splitter 20 corresponding to the radio frequency unit Tx1 is a:b, while a power allocation ratio of the power splitter 20 corresponding to the radio frequency unit Tx4 is b:a. In addition, power allocated by a power splitter located in the middle to a corresponding first sub-antenna is inversely proportional to power allocated by the power splitter to a corresponding second sub-antenna. Still refer to FIG. 1. The power splitter 20 corresponding to the radio frequency unit Tx2 and the power splitter 20 corresponding to the radio frequency unit Tx3 are located at a head and a tail respectively. Power allocation of the power splitter 20 corresponding to the radio frequency unit Tx2 is c:d, while a power allocation ratio of the power splitter 20 corresponding to the radio frequency unit Tx3 is d:c. The specified power allocation ratio is set so that a signal is enhanced in a specified area to implement beamforming, to cover the specified area.

Figure 2:
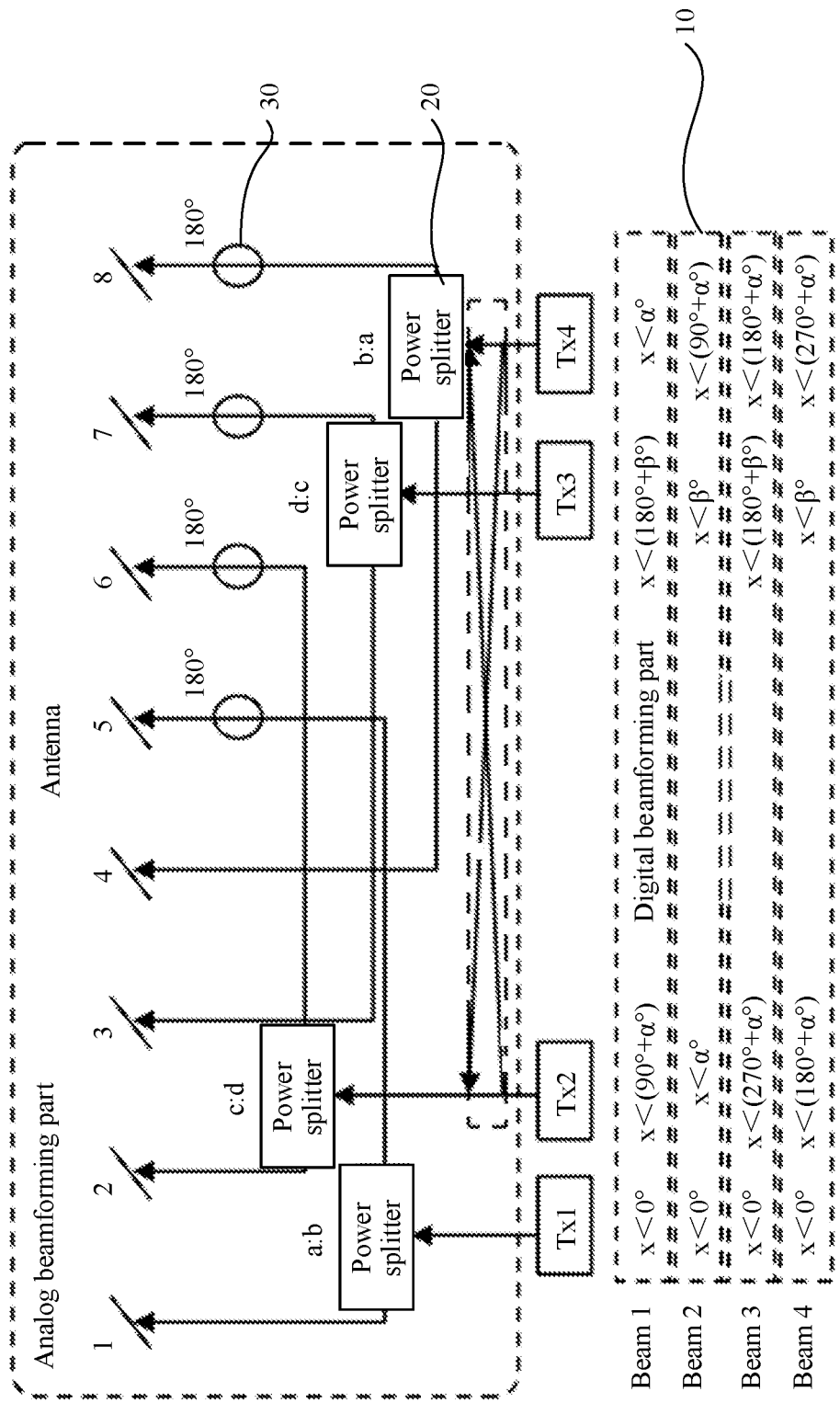
FIG. 2 shows beamforming of an antenna according to this application.

In addition to the foregoing manner of connecting the radio frequency unit to the corresponding first sub-antenna and the corresponding second sub-antenna, another manner may be used to implement corresponding connection between a radio frequency unit and sub-antennas. For example, in any two radio frequency units, an output end of one radio frequency unit is connected to an output end of the other radio frequency unit by using the phase shifter 30. During specific implementation, as shown in FIG. 2, the radio frequency unit Tx1 is connected to the radio frequency unit Tx4 by using a wire, and the wire may be considered as a phase shifter 30. During specific connection, an output end of the radio frequency unit Tx1 is connected to the power splitter 20 corresponding to the radio frequency unit Tx4 by using a wire. An output end of the radio frequency unit Tx4 is connected to the power splitter 20 corresponding to the radio frequency unit Tx1 by using a wire, where the wire may be considered as a phase shifter 30. In this case, signals input by the power splitter 20 corresponding to the radio frequency unit Tx4 include a signal transmitted by the radio frequency unit Tx1 and a signal transmitted by the radio frequency unit Tx4. Signals input by the power splitter 20 corresponding to the radio frequency unit Tx1 includes the signal transmitted by the radio frequency unit Tx1 and the signal transmitted by the radio frequency unit Tx4.

During beamforming, digital beamforming is first performed and analog beamforming is then performed on the antenna provided in this embodiment of this application. The digital beamforming is implemented by using a digital phase shifter 10. Specifically, the digital phase shifter 10 is connected to each radio frequency unit. When used, the digital phase shifter 10 is configured to transmit a plurality of signals to corresponding radio frequency units. The antennas shown in FIG. 1 and FIG. 2 are used as examples. FIG. 1 and FIG. 2 show signals corresponding to four beams. During the digital beamforming, the signal corresponding to each beam has a different phase when being transmitted to each radio frequency unit. As shown in FIG. 2, when a signal corresponding to a beam 1 is separately input to the radio frequency units Tx1, Tx2, Tx3, and Tx4, phases corresponding to the signal are $x<0°$, $x<(90°+\alpha°)$, $x<(180°+\beta°)$, and $x<\alpha°$ respectively. When a signal corresponding to a beam 2 is separately input to the radio frequency units Tx1, Tx2, Tx3, and Tx4, phases corresponding to the signal are $x<0°$, $x<\alpha°$, $x<\beta°$, and $x<(90°+\alpha°)$ respectively. When a signal corresponding to a beam 3 is separately input to the radio frequency units Tx1, Tx2, Tx3, and Tx4, phases corresponding to the signal are $x<0°$, $x<(270°+\alpha°)$, $x<(180°+\beta°)$, and x<(180°+α°) respectively. When a signal corresponding to a beam 4 is separately input to the radio frequency units Tx1, Tx2, Tx3, and Tx4, phases corresponding to the signal are x<0°, x<(180+α°), x<β°, and x<(270+α°) respectively. α and β are positive numbers. An area covered after the beamforming is adjusted by adjusting α and β. When the foregoing signals are correspondingly input to the radio frequency units Tx1, Tx2, Tx3, and Tx4, the beamforming is implemented in the antenna. The beam 1, the beam 2, the beam 3, and the beam 4 are sequentially arranged and cover a 120° sector area.

When the antenna provided in this embodiment of this application is used, the beamforming of the antenna is performed by using the digital phase shifter 10, to implement the beamforming through joint adjustment of the digital beamforming and the analog beamforming. When the digital beamforming is specifically performed, the digital phase shifter 10 may further superpose at least some of the plurality of signals to form a new signal, to form a new beam. The following describes the adjustment with reference to the accompanying drawings.

First, a structure of the antenna shown in FIG. 2 is used as an example. When the digital beamforming is specifically set, beams of the antenna may be changed in different manners. FIG. 3 shows two antennas, which are an upper array and a lower array. Analog beamforming and digital beamforming of the upper array and the lower array are implemented in same manners. The upper array is used as an example for description. Still refer to FIG. 3. The upper array includes four rows of sub-antennas. A quantity of sub-antennas in each row is 8 (four first sub-antennas and four second sub-antennas), and the sub-antennas correspond from left to right to the first sub-antenna 1, the first sub-antenna 2, the first sub-antenna 3, the first sub-antenna 4, the second sub-antenna 5, the second sub-antenna 6, the second sub-antenna 7, and the second sub-antenna 8 respectively in FIG. 2. A quantity of the plurality of signals transmitted by the digital phase shifter 10 in the antenna is 4. In this case, four beams are transmitted by the antenna. Four beams are implemented on the antenna through digital-analog hybrid beamforming, and each sub-antenna (the first sub-antenna and the second sub-antenna) has two polarizations. Each polarization transmits 1T signals, and ±45° cross-polarization transmits 2T signals. Therefore, 4*2T2R is formed on the upper array to cover a 120° sector area. Similarly, 4*2T2R is formed on the lower array. The coverage areas formed by the two arrays are added up together to form a 4*4T4R mode.

Figure 4:
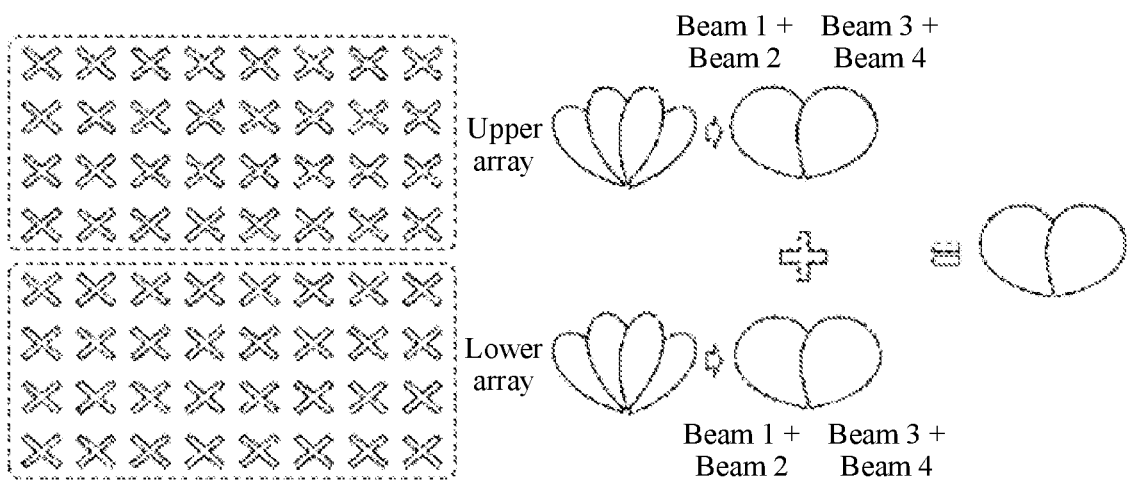
FIG. 4 shows another beamforming of an antenna according to this application.

When beam splitting of the antenna needs to be changed, the plurality of input signals may be combined by using the digital phase shifter 10, to form different beam splitting. For example, the digital phase shifter 10 superposes two signals in the plurality of signals to form a first signal, and superpose the other two signals to form a second signal. Specifically, beamforming implemented by superposition is shown in FIG. 4. On each antenna, the digital phase shifter 10 adds the beam 1 and the beam 2 to obtain a combined new beam, and adds the beam 3 and the beam 4 to obtain another combined new beam. In this case, the upper array changes from the original 4*2T2R mode to 2*2T2R. Similarly, the lower array changes from the original 4*2T2R mode to 2*2T2R. Coverage areas formed by the two arrays are added up together to form a 2*4T4R mode. In this way, a 2*4T4R networking solution with the second-high-load capacity is implemented, and the coverage areas of the two formed beams are the same.

Figure 5:
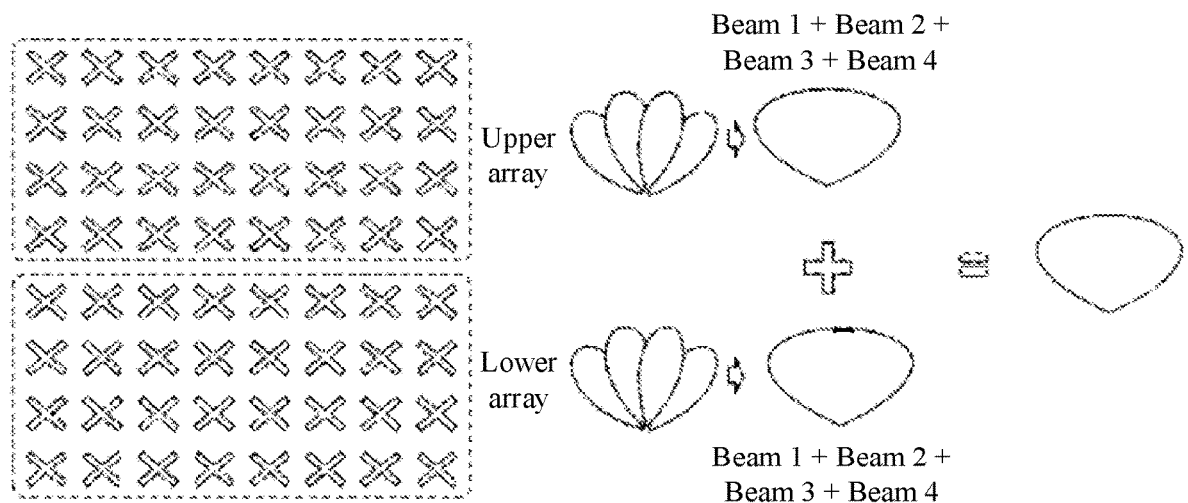
FIG. 5 shows another beamforming of an antenna according to this application.

Certainly, in addition to the case shown in FIG. 4, another beamforming manner may be used. For example, the digital phase shifter 10 is further configured to superpose the four signals to form a fourth signal. The fourth signal is sent to a radio frequency unit to form one beam. As shown in FIG. 5, the digital phase shifter 10 of each antenna adds the two beams shown in FIG. 4 to obtain a combined new beam. In this case, the upper array changes from the original 4*2T2R mode to 1*2T2R. Similarly, the lower array changes from the original 4*2T2R mode to 1*2T2R. Coverage areas formed by the two arrays are added up together to form a 1*4T4R mode. In this way, a 1*4T4R networking solution is implemented, and the coverage area of the formed beam is the same.

Certainly, in addition to the beamforming shown in FIG. 4 and FIG. 5, the signals corresponding to three of the four beams may be superposed. For example, the signals corresponding to the beam 1, the beam 2, and the beam 3 are superposed to form a new signal. Alternatively, the signals corresponding to the beam 2, the beam 3, and the beam 4 are superposed to form a new signal. In this case, for each antenna, a wide beam and a narrow beam are formed.

Figure 6:
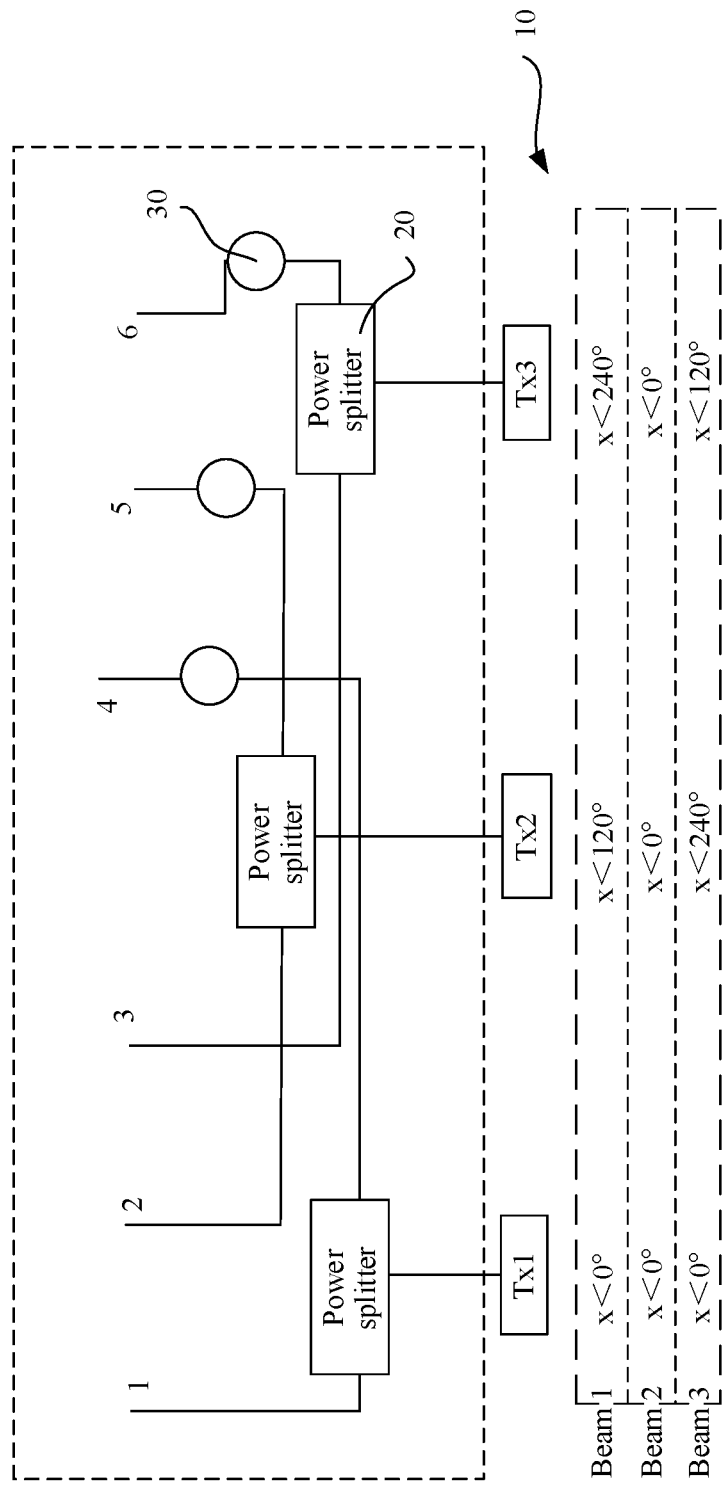
FIG. 6 is a block diagram of a structure of another antenna according to an embodiment of this application.

Certainly, the foregoing four beams are merely used as an example. For the antenna provided in this embodiment of this application, three beams may alternatively be formed. As shown in FIG. 6, a manner in which each radio frequency unit is connected to a sub-antenna in FIG. 6 is the same as the manner in FIG. 1, and details are not described herein again. FIG. 6 shows a structure in which three radio frequency units are used. The three radio frequency units are Tx1, Tx2, and Tx3 respectively, and each radio frequency unit is correspondingly connected to one power splitter 20. A power allocation ratio the power splitter 20 may also be set based on a requirement. As shown in FIG. 6, a power allocation ratio of a power splitter 20 corresponding to the radio frequency unit Tx1 is a:b, a power allocation ratio of a power splitter 20 corresponding to the radio frequency unit Tx2 is c:d, and a power allocation ratio of a power splitter 20 corresponding to the radio frequency unit Tx3 is b:a. The specified power allocation ratio is set so that a signal is enhanced in a specified area to implement beamforming, to cover the specified area. When the power allocation ratio of the power splitter 20 is set, an allocation manner of the power splitter 20 is also corresponding to arrangement of sub-antennas.

As shown in FIG. 6, along a specified direction, a plurality of first sub-antennas are adjacently arranged and a plurality of second sub-antennas are adjacently arranged. Specifically, as shown in FIG. 6, two sub-antennas corresponding to the radio frequency unit Tx1 are the first sub-antenna 1 and the second sub-antenna 4 respectively, two sub-antennas corresponding to the radio frequency unit Tx2 are the first sub-antenna 2 and the second sub-antenna 5 respectively, and two sub-antennas corresponding to the radio frequency unit Tx3 are the first sub-antenna 3 and the second sub-antenna 6 respectively. When the foregoing sub-antennas are arranged in an array, the plurality of first sub-antennas are adjacently arranged, and the plurality of second sub-antennas are adjacently arranged. The sub-antennas corresponding to the radio frequency units are arranged in a cross manner. For example, FIG. 6 shows arrangement of the sub-antennas: the first sub-antenna 1, the first sub-antenna 2, the first sub-antenna 3, the second sub-antenna 4, the second sub-antenna 5, and the second sub-antenna 6.

When a power allocation ratio of a power splitter corresponding to each radio frequency unit is correspondingly set, for power splitters arranged along an arrangement direction of the first sub-antennas, a ratio of power allocated by a power splitter at a head to a corresponding first sub-antenna and second sub-antenna is opposite to a ratio of power allocated by a power splitter at a tail to a corresponding first sub-antenna and second sub-antenna. As shown in FIG. 6, a power splitter 20 corresponding to the radio frequency unit Tx1 and a power splitter 20 corresponding to the radio frequency unit Tx3 are located at a head and a tail respectively, and power allocation ratios of the two power splitters are set as follows: A power allocation ratio of the power splitter 20 corresponding to the radio frequency unit Tx1 is a:b, while a power allocation ratio of the power splitter 20 corresponding to the radio frequency unit Tx3 is b:a. A power allocation ratio of a power splitter located in the middle is: A power allocation ratio of the power splitter 20 corresponding to the radio frequency unit Tx2 is c:d. The specified power allocation ratio is set so that a signal is enhanced in a specified area to implement beamforming, to cover the specified area.

The antenna shown in FIG. 6 correspondingly has three beams: a beam 1, a beam 2, and a beam 3. During the digital beamforming, a signal corresponding to each beam has a different phase when being sent to a radio frequency unit. As shown in FIG. 6, when a signal corresponding to the beam 1 is separately input to the radio frequency units Tx1, Tx2, and Tx3, phases corresponding to the signal are x<0°, x<120°, and x<240° respectively. When a signal corresponding to the beam 2 is separately input to the radio frequency units Tx1, Tx2, and Tx3, phases corresponding to the signal are x<0°, x<0°, and x<0° respectively. When a signal corresponding to the beam 3 is separately input to the radio frequency units Tx1, Tx2, and Tx3, phases corresponding to the signal are x<0°, x<240°, and x<120° respectively. When the foregoing signals are correspondingly input to the radio frequency units Tx1, Tx2, and Tx3, the beamforming is implemented in the antenna. The beam 1, the beam 2, and the beam 3 are sequentially arranged and cover a 120° sector area.

Figure 7:
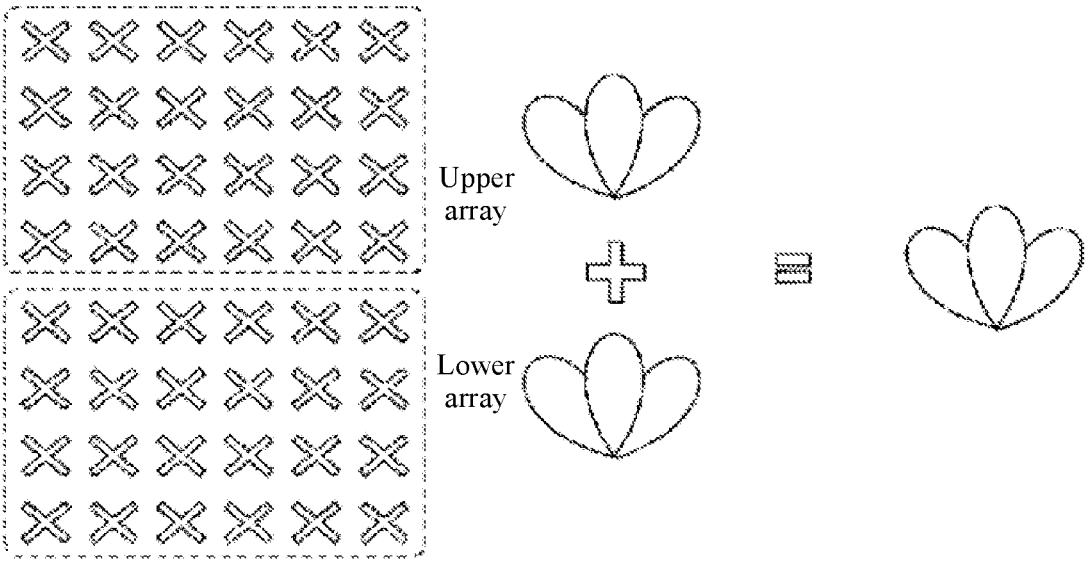
FIG. 7 shows beamforming of an antenna according to this application.

When the signals corresponding to the beam 1, the beam 2, and the beam 3 are used, for the antenna, a 120° sector area covered by the beam 1, the beam 2, and the beam 3 is correspondingly formed. FIG. 7 shows two antennas, which are an upper array and a lower array. Analog beamforming and digital beamforming of the upper array and the lower array are implemented in same manners. The upper array is used as an example for description. Still refer to FIG. 7. The upper array includes four rows of sub-antennas. A quantity of sub-antennas in each row is 6, and the sub-antennas correspond from left to right to the first sub-antenna 1, the first sub-antenna 2, the first sub-antenna 3, the second sub-antenna 4, the second sub-antenna 5, and the second sub-antenna 6 respectively in FIG. 6. A quantity of a plurality of signals transmitted by a digital phase shifter 10 corresponding to each sub-antenna is 4. In this case, three beams are transmitted by the antenna. Three beams are implemented on the antenna through digital-analog hybrid beamforming, and each sub-antenna has two polarizations. Each polarization transmits 1T signals. When the two polarizations are used, ±45 degrees cross-polarization transmits 2T signals. Therefore, 3*2T2R is formed on the upper array to cover a 120° sector area. Similarly, 3*2T2R is formed on the lower array. Coverage areas formed by the two arrays are added up together to form a 3*4T4R mode.

Figure 8:
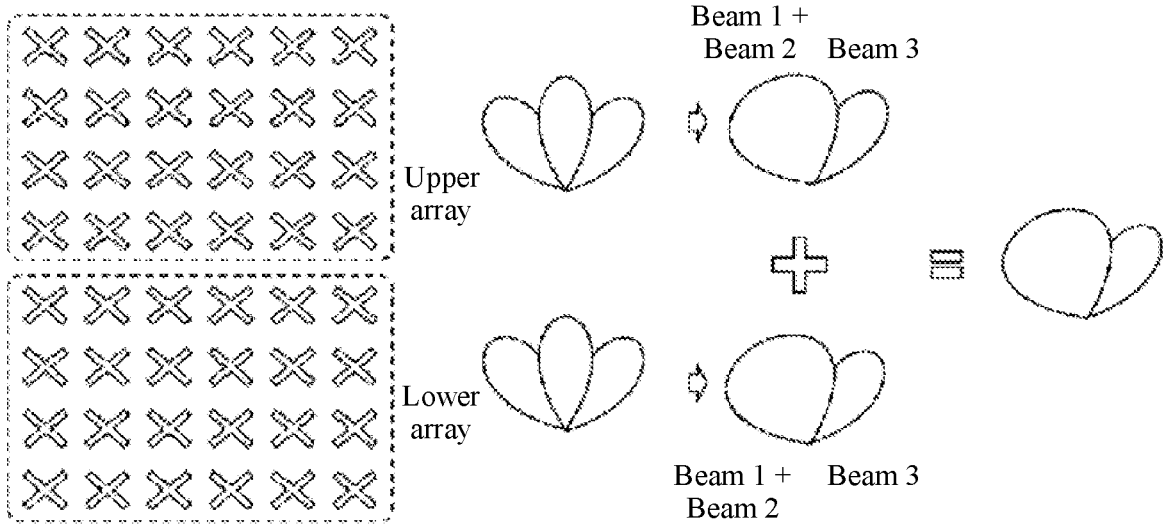
FIG. 8 shows another beamforming of an antenna according to this application.

When adjustment needs to be performed, as shown in FIG. 8, the digital phase shifter 10 is further configured to superpose two signals in the plurality of signals to form a third signal, and the other signal is directly sent to a radio frequency unit. Specifically, beamforming implemented by superposition is shown in FIG. 8. On each antenna, the digital phase shifter 10 adds the beam 1 and the beam 2 to obtain a combined new beam. In this case, the upper array changes from the original 3*2T2R mode to 2*2T2R. Similarly, the lower array changes from the original 3*2T2R mode to 2*2T2R. Coverage areas formed by the two arrays are added up together to form a 2*4T4R mode. In this way, a 2*4T4R networking solution with the second-high-load capacity is implemented, and the coverage areas of the two formed beams are the same. In beams shown in FIG. 8, a left beam is wider than a right beam, which is applicable to a scenario in which users are densely populated in the right front.

Figure 9:
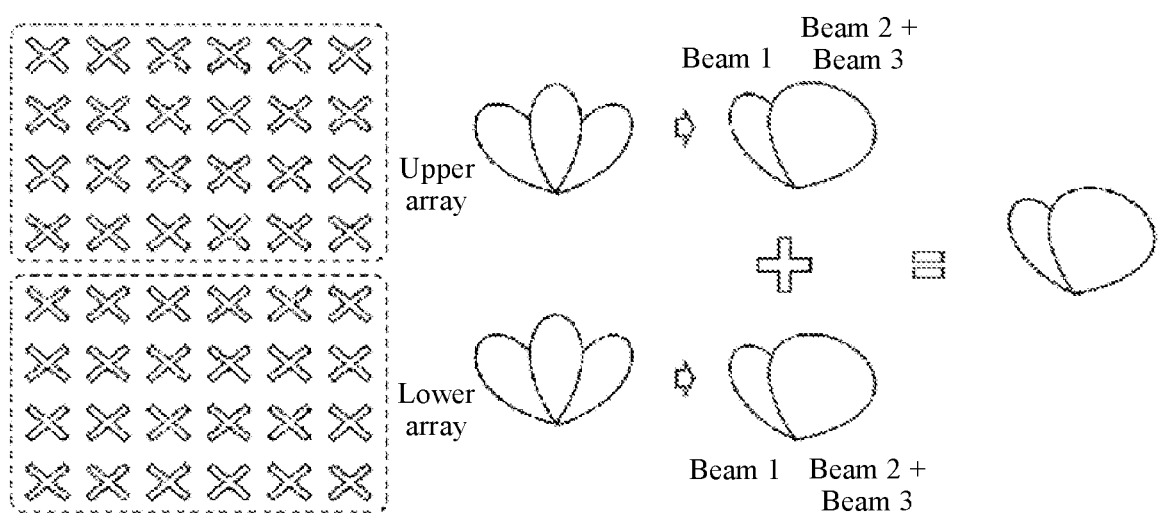
FIG. 9 shows another beamforming of an antenna according to this application.

Alternatively, a structure shown in FIG. 9 may be used. In this case, a digital phase shifter 10 of each antenna adds a beam 2 and a beam 3 to obtain a combined new beam. A combination manner is similar to the combination manner shown in FIG. 8, and details are not described herein again. In beams shown in FIG. 9, a right beam is wider than a left beam, which is applicable to a scenario in which users are densely populated in the left front.

It can be learned from the foregoing description that, during the antenna beamforming, beam splitting in antenna transmission can be changed by combining the digital beamforming and the analog beamforming, and a manner of disposing sub-antennas does not need to be changed, to improve applicability of the antenna without changing a hardware structure.

In addition, an embodiment of this application further provides a base station, where the base station includes the antenna in the foregoing embodiment. During antenna beamforming, beam splitting in antenna transmission is changed by combining digital beamforming and analog beamforming, to improve applicability of an antenna without changing a hardware structure. During specific setting, a quantity of antennas is 2, and the two antennas cover a same area. As shown in FIG. 3 and FIG. 4, the antennas cover the same area by using two arrays. In this way, 4T4R is formed.

It is clear that, a person skilled in the art can make various modifications and variations to this application without departing from the spirit and scope of this application. This application is intended to cover these modifications and variations of this application provided that they fall within the scope of the claims of this application and equivalent technologies thereof.

What is claimed is:

1. An antenna, comprising: a first sub-array and a second sub-array disposed adjacent to each other, wherein the first sub-array comprises N first sub-antennas arranged in an array, and the second sub-array comprises N second sub-antennas arranged in an array and connected to a plurality of phase shifters, wherein:

each row of the N first sub-antennas comprises M first sub-antennas, each row of the N second sub-antennas comprises M sub-antennas, each row of the N first sub-antennas and each row of the N second sub-antennas are arranged in a row, and an $m^{th}$ first sub-antenna and an $m^{th}$ second sub-antenna are connected to a radio frequency unit by using a power splitter, wherein N is a natural number, M is a natural number less than N, and m is a natural number less than or equal to M, and wherein the antenna further comprises a digital phase shifter, the digital phase shifter is connected to each radio frequency unit and is configured to transmit a plurality of signals to corresponding radio frequency units, and the digital phase shifter is further configured to superpose at least some of the plurality of signals to form a new signal, wherein one of the following is true:
  a quantity of the plurality of signals is 4, the digital phase shifter is further configured to superpose two signals in the plurality of signals to form a first signal, and superpose the other two signals in the plurality of signals to form a second signal; or
  a quantity of the plurality of signals is 4, and the digital phase shifter is further configured to superpose the four signals of the plurality of signals to form a fourth signal; or
  a quantity of the plurality of signals is 3, and the digital phase shifter is further configured to superpose two signals in the plurality of signals to form a third signal.

2. The antenna according to claim 1, wherein in power splitters connected to the M first sub-antennas in each row of the N first sub-antennas, a power-split ratio of a power splitter connected to an $n^{th}$ first sub-antenna is inversely proportional to a power-split ratio of a power splitter connected to an $[M-(n-1)]^{th}$ first sub-antenna, and n is a natural number less than or equal to M.

3. The antenna according to claim 1, wherein each signal corresponds to a different phase when being transmitted to each radio frequency unit.

4. The antenna according to claim 1, wherein each phase shifter connected to each second sub-antenna is a 180° phase shifter.

5. The antenna according to claim 1, wherein in any two radio frequency units, an output end of one radio frequency unit is connected to an output end of the other radio frequency unit by using a phase shifter.

6. A base station, including an antenna that comprises: a first sub-array and a second sub-array disposed adjacent to each other, wherein the first sub-array comprises N first sub-antennas arranged in an array, and the second sub-array comprises N second sub-antennas arranged in an array and connected to phase shifters, wherein:
  each row of the N first sub-antennas comprises M first sub-antennas, each row of the N second sub-antennas comprises M sub-antennas, each row of the N first sub-antennas and each row of the N second sub-antennas are arranged in a row, and an $m^{th}$ first sub-antenna and an $m^{th}$ second sub-antenna are connected to a radio frequency unit by using a power splitter, wherein N is a natural number, M is a natural number less than N, and m is a natural number less than or equal to M, and wherein
  the antenna further comprises a digital phase shifter, the digital phase shifter is connected to each radio frequency unit and is configured to transmit a plurality of signals to corresponding radio frequency units, and the digital phase shifter is further configured to superpose at least some of the plurality of signals to form a new signal, wherein one of the following is true:
    a quantity of the plurality of signals is 4, the digital phase shifter is further configured to superpose two signals in the plurality of signals to form a first signal, and superpose the other two signals in the plurality of signals to form a second signal; or
    a quantity of the plurality of signals is 4, and the digital phase shifter is further configured to superpose the four signals of the plurality of signals to form a fourth signal; or
    a quantity of the plurality of signals is 3, and the digital phase shifter is further configured to superpose two signals in the plurality of signals to form a third signal.

7. The base station according to claim 6, wherein a quantity of antennas is 2, and the two antennas cover a same area.

8. The base station according to claim 6, wherein in power splitters connected to the M first sub-antennas in each row of the N first sub-antennas, a power-split ratio of a power splitter connected to an $n^{th}$ first sub-antenna is inversely proportional to a power-split ratio of a power splitter connected to an $[M-(n-1)]^{th}$ first sub-antenna, and n is a natural number less than or equal to M.

9. The base station according to claim 6, wherein each signal corresponds to a different phase when being transmitted to each radio frequency unit.

10. The base station according to claim 6, wherein each phase shifter connected to each second sub-antenna is a 180° phase shifter.

11. The base station according to claim 6, wherein in any two radio frequency units, an output end of one radio frequency unit is connected to an output end of the other radio frequency unit by using a phase shifter.

12. A method, comprising:
  transmitting, by using an antenna, a plurality of signals, wherein
  the antenna comprises: a first sub-array and a second sub-array disposed adjacent to each other, wherein the first sub-array comprises N first sub-antennas arranged in an array, and the second sub-array comprises N second sub-antennas arranged in an array and connected to a plurality of phase shifters, wherein:
    each row of the N first sub-antennas comprises M first sub-antennas, each row of the N second sub-antennas comprises M sub-antennas, each row of the N first sub-antennas and each row of the N second sub-antennas are arranged in a row, and an mth first sub-antenna and an mth second sub-antenna are connected to a radio frequency unit by using a power splitter, wherein N is a natural number, M is a natural number less than N, and m is a natural number less than or equal to M, and wherein
  the antenna further comprises a digital phase shifter, the digital phase shifter is connected to each radio frequency unit and is configured to transmit the plurality of signals to corresponding radio frequency units, and the digital phase shifter is further configured to superpose at least some of the plurality of signals to form a new signal, wherein one of the following is true:
    a quantity of the plurality of signals is 4, the digital phase shifter is further configured to superpose two signals in the plurality of signals to form a first signal, and superpose the other two signals in the plurality of signals to form a second signal; or
    a quantity of the plurality of signals is 4, and the digital phase shifter is further configured to superpose the four signals of the plurality of signals to form a fourth signal; or
    a quantity of the plurality of signals is 3, and the digital phase shifter is further configured to superpose two signals in the plurality of signals to form a third signal.

13. The method according to claim 12, wherein in power splitters connected to the M first sub-antennas in each row of the N first sub-antennas, a power-split ratio of a power splitter connected to an $n^{th}$ first sub-antenna is inversely proportional to a power-split ratio of a power splitter connected to an $[M-(n-1)]^{th}$ first sub-antenna, and n is a natural number less than or equal to M.

14. The method according to claim 12, wherein each signal corresponds to a different phase when being transmitted to each radio frequency unit.

15. The method according to claim 12, wherein each phase shifter connected to each second sub-antenna is a 180° phase shifter.

16. The method according to claim 12, wherein in any two radio frequency units, an output end of one radio frequency unit is connected to an output end of the other radio frequency unit by using a phase shifter.

\* \* \* \* \*

UNITED STATES PATENT AND TRADEMARK OFFICE
CERTIFICATE OF CORRECTION

| | |
|---|---|
| PATENT NO. | : 12,113,297 B2 |
| APPLICATION NO. | : 17/541389 |
| DATED | : October 8, 2024 |
| INVENTOR(S) | : Mingfu Qin, Libiao Wang and Siyan Chen |

It is certified that error appears in the above-identified patent and that said Letters Patent is hereby corrected as shown below:

In the Claims

In Column 12, In Line 41, In Claim 12, delete "Nis" and insert -- N is --.

Signed and Sealed this
Eleventh Day of February, 2025

Coke Morgan Stewart
*Acting Director of the United States Patent and Trademark Office*